United States Patent Office 3,254,049
Patented May 31, 1966

3,254,049
VINYL FLOORING
Albert J. Cole, Pottstown, and Robert Reichard, Schwenksville, Pa., assignors to The Firestone Tire & Rubber Company, Akron, Ohio, a corporation of Ohio
No Drawing. Filed Dec. 22, 1961, Ser. No. 161,423
4 Claims. (Cl. 260—41)

This invention relates to vinyl flooring. It may be either asbestos flooring or what is known as homogeneous flooring in which the mineral filler incorporated in it is free of fibrous constituents.

The vinyl component is a graft copolymer, the superstrate providing internal plasticization for the substrate. Thus it is free from liquid plasticizer which can separate and exude to the surface of the flooring and be removed therefrom by scrubbing with aqueous solutions of soap or detergent. The flooring is non-staining and it is impossible for it to lose plasticizer and thus become brittle on aging.

The copolymer substrate is polyvinylchloride which constitutes 50 to 60 parts, by weight, of the copolymer content. The superstrate, based on the weight of the copolymer, is 30 to 40 parts polyethylacrylate and 9 to 11 parts of polyacrylonitrile.

The graft copolymer is advantageously made by adding the monomers for the superstrate to the substrate without adding additional catalyst, all of the catalyst being supplied during polymerization of the vinyl chloride. This insures polymerization of the superstrate monomers onto the substrate, whereas when catalyst is added for polymerization of the superstrate onto the substrate, the added monomers may form homopolymers or copolymers among themselves.

Any usual stabilizer is added to the graft copolymer and the filler is incorporated in the graft copolymer in any usual manner in a desired amount, equal generally to 150 to 350 parts per 100 parts of the graft copolymer. Less filler is used in floorings for institutional and industrial uses where the flooring is to be subjected to greater wear, and more may be used in flooring designed for use in the home. Various mixtures of powdered and fibrous fillers may be used, as is known in the art. Coloring pigment may be added as required.

The following examples are illustrative.

PREPARATION OF COPOLYMER

Polyvinylchoride is first prepared in an emulsion system, as by employing the following recipe:

| | Parts |
|---|---|
| Vinyl chloride | 100.0 |
| Emusifier [1] | 5 |
| $K_2S_2O_8$ | 0.15 |
| $Na_2HPO_4 \cdot 12H_2O$ | 0.3 |
| Water | 100 |

[1] An alkyl-aryl sulfonate is preferred, but other emulsifier may be used.

The mixture is polymerized at 45° C. for 16 to 18 hours. The monomer is virtually 100 percent converted in this time and has the following characteristics:

| | |
|---|---|
| pH | 7.0 to 7.1 |
| Percent floc (precoagulum) | 0.9 to 1.1 |
| Surface tension (Du Nouy-corrected) dynes | 43.4 |
| Total solids percent | 49–50 |

This latex can be stored in closed containers for several weeks before grafting.

The superstrate monomers are added to the resulting polyvinylchloride latex along with sufficient water to give a solids total of 40 to 50 percent. The superstrate monomers are acrylonitrile and ethylacrylate or other acrylate containing 1 to 4 carbon atoms in the alkyl group. A typical recipe for the graft polymerization follows. It is noted that in such a preferred procedure, no additional catalyst is added.

| | Minimum, parts | Maximum, parts |
|---|---|---|
| Polyvinylchloride latex | [1] 50 | [1] 60 |
| Ethylacrylate | 30 | 40 |
| Acrylonitrile | 9 | 11 |
| Water necessary to bring the solids content to 40 to 50% | | |

[1] Dry polymer.

The mixture is polymerized at 65° C. for 18–20 hours until the conversion is substantially complete. The resulting latex is dried either by spray drying or other means, or may be coagulated by any convenient method such as by treatment with $CaCl_2$, $NaCl$ or $Al_2(SO_4)_3$ solutions, washed and dried.

In the graft copolymer, the polyvinylchloride provides wear resistance, and grafts containing as much as 60 percent polyvinylchloride are used where a tough flooring is required. The polyethylacrylate provides flexibility, and a copolymer with as much as 40 percent polyethylacrylate may be used where great flexibility is desired. The polyacrylonitrile aids processing and it provides stain resistance and oil resistance. The compounded materials may be sheeted out by calendering or extruding. Any suitable backing may be used for floorings, etc.

The following typical formulae for asbestos flooring compare three different floorings made from graft copolymer resin of the invention (identified as Copolymers I, II and III in the following table) with a commercial flooring (identified as Control) prepared from plasticized polyvinylchloride resin.

COPOLYMER COMPOSITIONS

| | Copolymer I | Copolymer II | Copolymer III |
|---|---|---|---|
| Polyvinyl Chloride | 50 | 55 | 60 |
| Polyethyl Acrylate | 40 | 35 | 30 |
| Polyacrylonitrile | 10 | 10 | 10 |

TABLE A.—ASBESTOS-FILLER FLOORINGS

| | Product A | Product B | Product C | Control |
|---|---|---|---|---|
| Copolymer I | 132 | | | |
| Copolymer II | | 132 | | |
| Copolymer III | | | 132 | |
| Resin Plus Plasticizer | | | | 100 |
| DOP | 0 | 0 | 0 | 27 |
| Paraplex G-62 | 0 | 0 | 0 | 5 |
| Total Binder | 132 | 132 | 132 | 132 |
| Inerts: | | | | |
| Asbestos | 133 | 133 | 133 | 133 |
| $CaCO_3$ | 190 | 190 | 190 | 190 |
| $TiO_2$ | 3 | 3 | 3 | 3 |
| Stabilizer | 6 | 6 | 6 | 6 |
| Wax Lubricant | 0.75 | 0.75 | 0.75 | 0.75 |
| Test Results: | | | | |
| Stain | (1) | (1) | (1) | (2) |
| Identation: | | | | |
| After 1 min | 0.006″ | 0.005″ | 0.006″ | 0.011″ |
| After 10 min | 0.007″ | 0.006″ | 0.007″ | 0.015″ |
| Flexibility: | | | | |
| Unaged | 1.9 | 1.4 | 1.8 | 2+ |
| Aged | 2+ | 1.6 | 2.0 | 2+ |
| Abrasion, percent | 0.17 | 0.19 | 0.20 | 0.38 |

[1] Less.
[2] Control.

Test identifications

The indentation test is made by the McBurney indent tester.

In the standard flexibility test of the flooring industry for asbestos-filler flooring, a 1″ x 8″ sample of the compounded flooring is depressed at the rate of 5″/min. A one-inch depression is considered passable. In the case of the tests on homogeneous samples (Table B), flexibility is determined by bending a sample through 180 degrees on a 1″ mandrel in three seconds.

Abrasion is determined on a Tabor abrasor by the percent weight loss of 1000 cycles on a 0.125″ sample using a CS-17 wheel.

The same copolymers were used in homogeneous flooring compositions with results recorded in the following table:

TABLE B.—HOMOGENEOUS FLOORINGS

|  | Product D | Product E | Product F | Control |
|---|---|---|---|---|
| Copolymer I | 150 |  |  |  |
| Copolymer II |  | 150 |  |  |
| Copolymer III |  |  | 150 |  |
| Resin Plus Plasticizer |  |  |  | 100 |
| DOP | 0 | 0 | 0 | 45 |
| Paraplex G-62 | 0 | 0 | 0 | 5 |
| Total Binder | 150 | 150 | 150 | 150 |
| Inerts: |  |  |  |  |
| CaCO₃ | 115 | 115 | 115 | 115 |
| Clay | 115 | 115 | 115 | 115 |
| TiO₂ | 4 | 4 | 4 | 4 |
| Stabilizer | 3 | 3 | 3 | 3 |
| Wax Lubricant | 0.5 | 0.5 | 0.5 | 0.5 |
| Test Results: |  |  |  |  |
| Stain | (¹) | (¹) | (¹) | (²) |
| Indentation: |  |  |  |  |
| 1 min | 0.005″ | 0.001″ | 0.004″ | 0.020″ |
| 10 min | 0.006″ | 0.002″ | 0.005″ | 0.022″ |
| Flexibility | (³) | (³) | (³) | (³) |
| Abrasion, Percent | 0.11 | 0.14 | 0.14 | 0.277 |

¹ Less.
² Control.
³ Passes.

The floorings of this invention withstand the standard Dimensional Stability and Stain tests. In the Dimensional Stability test any change in linear dimensions more than plus or minus 0.024 inch per linear foot when aged 180° F. for 6 hours is considered to have failed. In the Stain test, a small mass of asphalt is placed on the wearing surface of a tile of the flooring material, and left for 24 hours at 125° F. The asphalt is scraped off and the surface washed with VM & P naphtha, and the amount the tile is stained relative to the control is a measure of the staining.

What we claim is:

1. A flooring composition which comprises 100 parts by weight of graft copolymer and 150 to 350 parts of filler distributed therein; the copolymer being made by polymerizing vinyl chloride and then polymerizing thereon ethylacrylate and acrylonitrile, and being composed of 50 to 60 parts by weight of polyvinylchloride as substrate to which is grafted, as superstrate, 30 to 40 parts by weight of ethylacrylate, and 9 to 11 parts of acrylonitrile.

2. The flooring composition of claim 1 in which the polymerization of the substrate is catalyzed and the polymerization of the superstrate thereon is catalyzed without added catalyst.

3. The composition of claim 1 in which a large part of the filler is asbestos.

4. The composition of claim 1 in which the filler is largely clay and calcium carbonate.

References Cited by the Examiner

UNITED STATES PATENTS

| 2,746,944 | 5/1956 | Naps et al. | 260—45.5 |
| 2,763,631 | 9/1956 | Coover et al. | 260—45.5 |
| 2,837,490 | 6/1958 | Hecker | 260—41 |

MORRIS LIEBMAN, *Primary Examiner.*

LEON J. BERCOVITZ, *Examiner.*

K. B. CLARKE, *Assistant Examiner.*